United States Patent
Lee et al.

(10) Patent No.: US 10,573,912 B2
(45) Date of Patent: Feb. 25, 2020

(54) FUEL CELL SYSTEM AND METHOD FOR CONTROLLING THE SAME

(71) Applicant: HYUNDAI MOTOR COMPANY, Seoul (KR)

(72) Inventors: Nam Woo Lee, Hwaseong-si (KR); Hyun Suk Choo, Seongnam-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 295 days.

(21) Appl. No.: 15/385,850

(22) Filed: Dec. 20, 2016

(65) Prior Publication Data

US 2018/0108927 A1    Apr. 19, 2018

(30) Foreign Application Priority Data

Oct. 18, 2016  (KR) .................. 10-2016-0134828

(51) Int. Cl.
*H01M 4/92* (2006.01)
*H01M 8/1018* (2016.01)
(Continued)

(52) U.S. Cl.
CPC ....... *H01M 8/04955* (2013.01); *H01M 4/926* (2013.01); *H01M 8/04089* (2013.01);
(Continued)

(58) Field of Classification Search
CPC ............. H01M 8/04955; H01M 4/926; H01M 8/04559; H01M 8/04753; H01M 8/04873; H01M 2008/1095; H01M 2250/20
See application file for complete search history.

(56) References Cited

U.S. PATENT DOCUMENTS 9,343,756 B2 * 5/2016 Oh ...................... H01M 8/0258
2004/0157103 A1 * 8/2004 Takeguchi .......... H01M 8/0258
                                                                        429/413

FOREIGN PATENT DOCUMENTS

JP        2008066211 A    3/2008
JP         4888519 B2     2/2012
(Continued)

OTHER PUBLICATIONS

JP 2012-185968 Machine Translation.*

*Primary Examiner* — Amy Cohen Johnson
*Assistant Examiner* — Paul D Baillargeon
(74) *Attorney, Agent, or Firm* — McDonnell Boehnen Hulbert & Berghoff LLP

(57) ABSTRACT

Disclosed are a fuel cell system and a method for controlling the same which enable performance recovery of a stack together with a high potential avoidance operation while operating the fuel cell system. The fuel cell system includes a fuel cell stack, in which a first separation plate having a first air flow path and a second separation plate having a second, different air flow path are alternately stacked with a membrane-electrode assembly interposed therebetween; and the method includes determining whether a high-potential avoidance operation is required while operating the fuel cell system including the fuel cell stack, and selectively supplying air to the air flow path of the first separation plate or the second separation plate when a high-potential avoidance operation is required, so as to easily achieve cathode performance recovery during the high-potential avoidance operation of the fuel cell system and the operation of the fuel cell system.

10 Claims, 7 Drawing Sheets

(51) Int. Cl.

| | |
|---|---|
| *H01M 8/04746* | (2016.01) |
| *H01M 8/04955* | (2016.01) |
| *H01M 8/04223* | (2016.01) |
| *H01M 8/04089* | (2016.01) |
| *H01M 8/04082* | (2016.01) |
| *H01M 8/04664* | (2016.01) |
| *H01M 8/2483* | (2016.01) |
| *H01M 8/04537* | (2016.01) |
| *H01M 8/2457* | (2016.01) |
| *H01M 8/04858* | (2016.01) |

(52) U.S. Cl.
CPC ... *H01M 8/04201* (2013.01); *H01M 8/04223* (2013.01); *H01M 8/04552* (2013.01); *H01M 8/04559* (2013.01); *H01M 8/04679* (2013.01); *H01M 8/04753* (2013.01); *H01M 8/04873* (2013.01); *H01M 8/2457* (2016.02); *H01M 8/2483* (2016.02); *H01M 2008/1095* (2013.01); *H01M 2250/20* (2013.01); *Y02T 90/32* (2013.01)

(56) References Cited

FOREIGN PATENT DOCUMENTS

| | | | |
|---|---|---|---|
| JP | 2012185968 A | * | 9/2012 |
| JP | 5411920 B2 | | 2/2014 |
| KR | 1007984510000 | | 1/2008 |
| KR | 100986500 B1 | | 10/2010 |
| KR | 1020120059226 | | 6/2012 |
| KR | 101575415 B1 | | 12/2015 |

\* cited by examiner

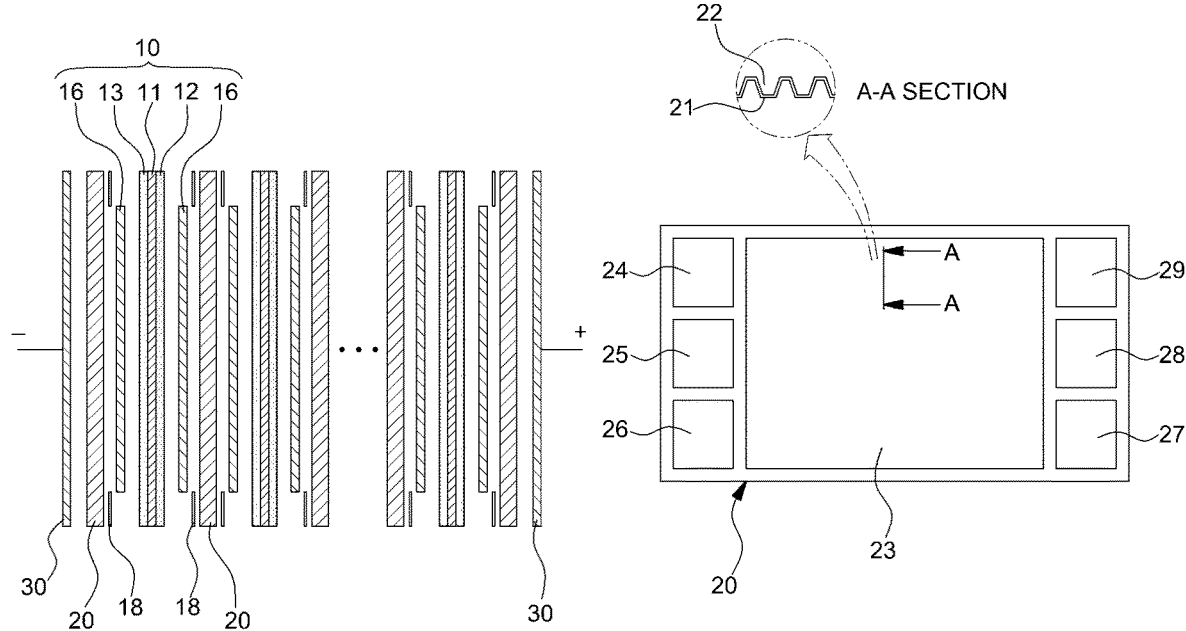
FIG. 1A
PRIOR ART
FIG. 1B
PRIOR ART
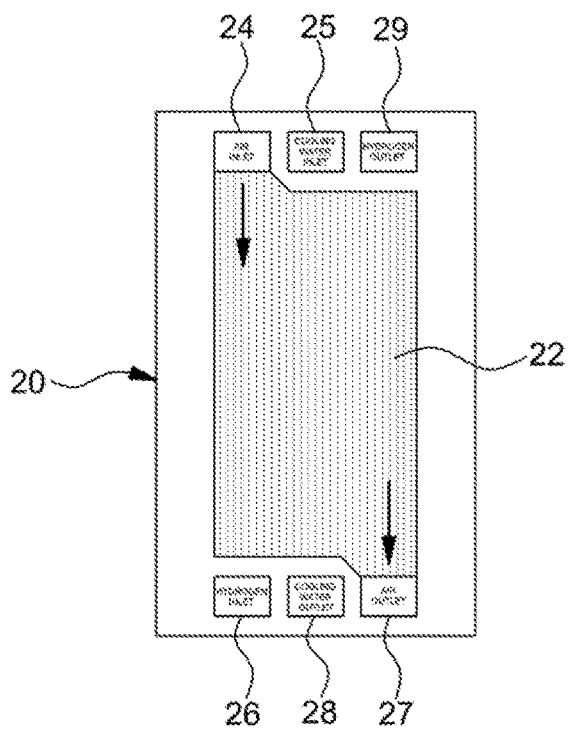
FIG. 2
PRIOR ART

FUEL CELL SYSTEM AND METHOD FOR CONTROLLING THE SAME

CROSS-REFERENCE TO RELATED APPLICATION

This application claims under 35 U.S.C. § 119(a) priority to and the benefit of Korean Patent Application No. 10-2016-0134828 filed on Oct. 18, 2016, the entire contents of which are incorporated herein by reference.

BACKGROUND

(a) Technical Field

The present disclosure relates to a fuel cell system and a method for controlling the same. More particularly, it relates to a fuel cell system and a method for controlling the same which enable cathode performance recovery of a fuel cell stack together during a high potential avoidance operation while operating the fuel cell system.

(b) Background Art

A conventional fuel cell system mounted on a fuel cell vehicle includes, a fuel cell stack generating electricity by an electrochemical reaction of hydrogen and oxygen, a hydrogen supply system supplying hydrogen (fuel) to the fuel cell stack, an air supply system supplying air as an oxidizer necessary for the electrochemical reactions of the fuel cell stack, and a heat and water management system that removes electrochemical reaction heat of the fuel cell stack and controls the operation temperature of the stack, among other components.

The fuel cell stack generates electricity as a primary energy source for a fuel cell vehicle, and is configured by stacking tens to hundreds of unit cells.

A unit cell configuration for the conventional fuel cell stack is described below with reference to FIGS. 1A and 1B.

A membrane-electrode assembly (MEA) 10 including a polymer electrolyte membrane 11 which can transport a hydrogen proton, and a cathode 12 and an anode 13, which are catalytic layers applied so that the hydrogen and the oxygen react with each other on both surfaces of the electrolyte membrane, is positioned at an innermost side of the fuel cell stack.

A gas diffusion layer (GDL) 16 and a gasket 18 are sequentially stacked outside the cathode 12 and the anode 13, separation plates 20 having a flow field in which the fuel (hydrogen) and the oxidizer (air) flow and a flow field in which cooling water flows, respectively are stacked outside the gas diffusion layer 16, and an end plate for supporting and fixing the respective components is coupled to an outermost side of the fuel cell stack.

In anode 13 of the fuel cell stack, an hydrogen undergoes an oxidation reaction to generate a proton and an electron. Hydrogen ions and electrons generated at this time transport through electrolyte membrane 10 and the separation plates 20 to cathode 12. Water is generated by an electrochemical reaction between the hydrogen ions and the electrons which move from the anode 13 and the oxygen in the air at cathode 12, and electric energy generated by the flow of the electrons is supplied in response to a load demand requiring the electric energy through concatenated current collecting plates 30 in the end plate.

Separation plate 20 is partitioned into a reaction area unit 23 at a central region and manifolds formed at both ends.

The reaction area unit 23 comprises a flow field 21, which is a flat part directly contacting gas diffusion layer 16, and a channel 22, which is a space between flow fields 21 and allows passage of the hydrogen fuel or the air (oxygen).

The manifolds are classified into a supply-side manifold formed at one end of separation plate 20 and a discharge-side manifold formed at the other end of separation plate 20. The supply-side manifold comprises an air supply manifold 24, a cooling water supply manifold 25, and a hydrogen supply manifold 26 for supplying the air, the cooling water, the hydrogen, respectively, and the like to channel 22. The discharge-side manifold comprises an air discharge manifold 27, a cooling water discharge manifold 28, and a hydrogen discharge manifold 29 for discharging the air, the cooling water, the hydrogen, respectively, and the like from channel 22.

Air flows through channel 22 formed on one surface of separation plate 20, and the hydrogen flows through channel 22 formed on the other surface of separation plate 20.

On the air flow surface of separation plate 20, air flows from air supply manifold 24, through channel 22 of the reaction area unit, and out air discharge manifold 27 as illustrated in FIG. 2. As air flows in channel 22, the air undergoes a reaction with hydrogen generating electricity.

On the hydrogen flow surface of separation plate 20, hydrogen flows from hydrogen supply manifold 26, through channel 22 of the reaction area unit, and out of hydrogen discharge manifold 29. As hydrogen flows through channel 22, it reacts with the oxygen in the air generating electricity.

During operation of the fuel cell stack, polymer electrolyte membrane 11 and cathode 12 and anode 13 disposed on both sides thereof, that is, the catalytic layers (Pt supported on carbon (Pt/C)) constituting the MEA deteriorate, resulting in reduced performance of the fuel cell stack over time.

In particular, it is known that deterioration of the cathode surface (typically Pt) leads to formation of an oxide coating (Pt-Oxide, Pt—OH, Pt—O, Pt—$O_2$, and the like) on the cathode surface. As the size of the oxide coating increases, adsorption of the reaction oxygen ($O_2$) onto the platinum surface is disrupted, the oxygen reduction reaction speed (ORR) of the cathode decreases, and, as a result, the stack performance decreases.

Therefore, to recover the performance of the fuel cell, a method in which a hydrogen atmosphere is created in the cathode by interrupting the air supplied to the stack, extracting current from the stack, and pumping hydrogen to the cathode to reduce the oxide coating on the cathode, has been used. However, the method leads to increased hydrogen consumption due to the hydrogen pumping, and as a result, cost increases and performance recovery is a time-intensive process.

In a conventional fuel cell stack, hydrogen pumping occurs when the stack is stopped by extracting the current from the fuel cell stack. As a result, the performance recovery process cannot be performed while operating the fuel cell stack (i.e., while electricity is being generated by the electrochemical reaction between air and oxygen).

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present disclosure addresses the above-described problems associated with the related art by providing a fuel cell system and a method for controlling the same, wherein a fuel cell stack comprises a first separation plate and a second separation plate having different air flow paths are formed alternately stacked with a membrane-electrode assembly interposed therebetween. The control method determines whether a high-potential avoidance operation (i.e. limiting the voltage output to an amount lower than the open end voltage of the fuel cell to avoid ionization of the catalyst surface platinum) is required while operating the fuel cell system including the fuel cell stack. If a high-potential avoidance operation is necessary, air is selectively supplied to the air flow path of the first separation plate or the second separation plate to easily achieve recovery of cathode performance during the high-potential avoidance operation of the fuel cell system.

In one aspect, the present disclosure provides a fuel cell system including: a fuel cell stack in which a first separation plate having a first air flow path and a second separation plate having a second air flow path are alternately stacked with a membrane-electrode assembly interposed therebetween; a first air inlet line and a first air outlet line connected to an inlet and an outlet of the first air flow path of the first separation plate, respectively; a second air inlet line and a second air outlet line connected to the inlet and the outlet of the second air flow path of the second separation plate, respectively; a first air supply device connected to a first air inlet line of the first separation plate and a second air inlet line of the second separation plate; a first valve mounted on the first air inlet line; a second valve is mounted on the second air inlet line; and a controller controlling operation of the first air supply device and opening/closing of the first and second valves.

In another aspect, the present disclosure provides a fuel cell system including: a fuel cell stack in which a first separation plate having a first air flow path and a second separation plate having a second air flow path are alternately stacked with a membrane-electrode assembly interposed therebetween; a first air inlet line and a first air outlet line connected to an inlet and an outlet of the first air flow path of the first separation plate, respectively; a second air inlet line and a second air outlet line connected to the inlet and the outlet of the second air flow path of the second separation plate, respectively; a first air supply device connected to a first air inlet line of the first separation plate and a second air inlet line of the second separation plate; a first valve mounted on the first air outlet line; a second valve mounted on the second air outlet line; and a controller controlling operation of the first air supply device and opening/closing of the first and second valve.

In still another aspect, the present disclosure provides a fuel cell system including: a fuel cell stack in which a first separation plate having a first air flow path and a second separation plate having a second air flow path are alternately stacked with a membrane-electrode assembly interposed therebetween; a first air inlet line and a first air outlet line connected to an inlet and an outlet of the first air flow path of the first separation plate, respectively; a second air inlet line and a second air outlet line connected to the inlet and the outlet of the second air flow path of the second separation plate, respectively; a first air supply device connected to the first air inlet line; a second air supply device connected to the second air inlet line; and a controller controlling operation of the first air supply device and the second air supply device.

In each example embodiment of the fuel cell system, the first separation plate includes a first air flow path comprising a first air inlet manifold connected with the first air inlet line, a first air outlet manifold connected with the first air outlet line, and a first channel formed between and communicating with the first air inlet manifold and the first air outlet manifold; and a second air inlet manifold connected with a second air inlet line and a second air outlet manifold connected with a second air outlet line that do not communicate with each other.

In each example embodiment of the fuel cell system, the second separation plate may include a second air flow path comprising a second air inlet manifold connected with the second air inlet line, a second air outlet manifold connected with the second air outlet line, and a second channel formed between the second air inlet manifold and the second air outlet manifold; and a first air inlet manifold connected with a first air inlet line and a first air outlet manifold connected with a first air outlet line that do not communicate with each other.

In yet another aspect, the present disclosure provides a method for controlling a fuel cell system, including: i) providing a fuel cell stack in which a first separation plate having a first air flow path and a second separation plate having a second air flow path are alternately stacked with a membrane-electrode assembly interposed therebetween in each cell; ii) determining whether a high-potential avoidance operation is required by measuring the voltage of the respective cells constituting the fuel cell stack; iii) interrupting air supply to one of the first air flow path of the first separation plate and the second air flow path of the second separation plate if it is determined that the high-potential avoidance operation is required; iv) performing a normal electricity generation reaction in a cell including a first separation plate or a second separation plate in which the air supply to the air flow path is permitted; v) causing autonomous hydrogen pumping to occur a cathode and recovering the cathode in a cell including a first separation plate or a second separation plate in which the air supply to the air flow path is interrupted; and vi) determining whether the high-potential avoidance operation should be cancelled.

The present disclosure addresses the issues described above by providing a system and method as described below.

First, a fuel cell stack is provided, in which a first separation plate and a second separation plate in which different air flow paths are formed are alternately stacked with a membrane-electrode assembly interposed therebetween. When it is determined that a high-potential avoidance operation is required while operating the fuel cell system, air is selectively supplied to the air flow path of the first separation plate or the second separation plate to enable the high-potential avoidance operation of the fuel cell system and prevent oxidation phenomenon of the platinum catalyst of a cathode during the high-potential avoidance operation.

Second, air flow through first air flow path 114 of first separation plate 110 or second air flow path 124 of second separation plate 120 is interrupted. Autonomous hydrogen pumping occurs in a cathode of a specific cell including the separation plate to which the air flow is interrupted. As a result, a hydrogen atmosphere is created in the cathode causing reduction of the catalyst oxide formed on the surface of the cathode, thereby achieving cathode performance recovery.

Other aspects and preferred embodiments of the disclosure are discussed below.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain example embodiments thereof illustrated in the accompanying drawings which are given hereinbelow by way of illustration only, and thus are not limitative of the present disclosure, and wherein:

FIGS. 1A and 1B are schematic views illustrating a unit cell configuration of a conventional fuel cell stack and the corresponding separation plate structure;

FIG. 2 is a schematic view illustrating an air flow path in a conventional separation plate;

Figures 3A, 3B:
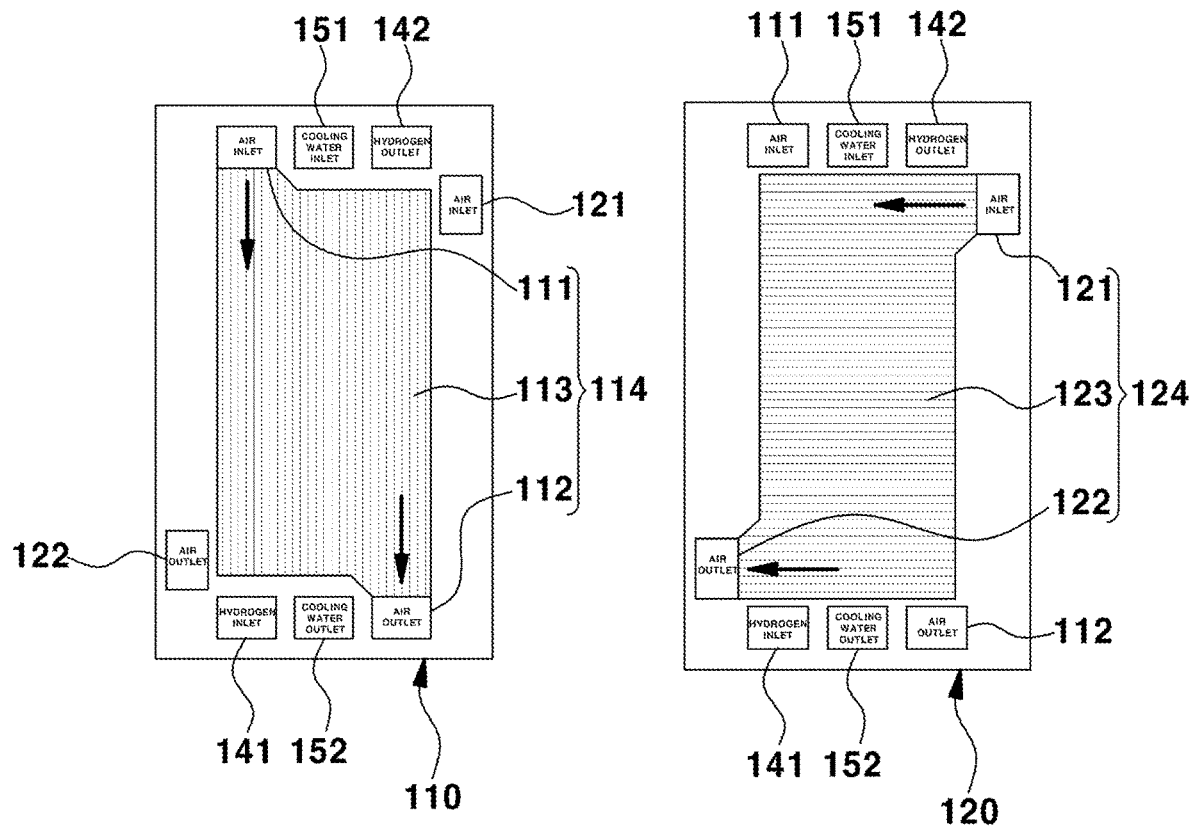
FIGS. 3A 3B and 3C are schematic views illustrating the separation plate structure of an example embodiment of a fuel cell system according to the present disclosure.

Reference numerals set forth in the Drawings includes reference to the following elements as further discussed below:

100: fuel cell stack
110: first separation plate
111: first air inlet manifold
112: first air outlet manifold
113: first channel
114: first air flow path
120: second separation plate
121: second air inlet manifold
122: second air outlet manifold
123: second channel
124: second air flow path
131: first air inlet line
132: second air inlet line
133: first air outlet line
134: second air outlet line
141: hydrogen supply manifold
142: hydrogen discharge manifold
151: cooling water supply manifold
152: cooling water discharge manifold
161: first air supply device
162: second air supply device
171: first valve
172: second valve
180: controller It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will describe various example embodiments, it will be understood that present description is not intended to limit the invention to those example embodiments. On the contrary, the invention is intended to cover not only the example embodiments, but also various alternatives, modifications, equivalents and other embodiments, which may be included within the spirit and scope of the invention as defined by the appended claims.

Hereinafter, preferred embodiments of the present disclosure are described in detail with reference to the accompanying drawings.

Figure 9:
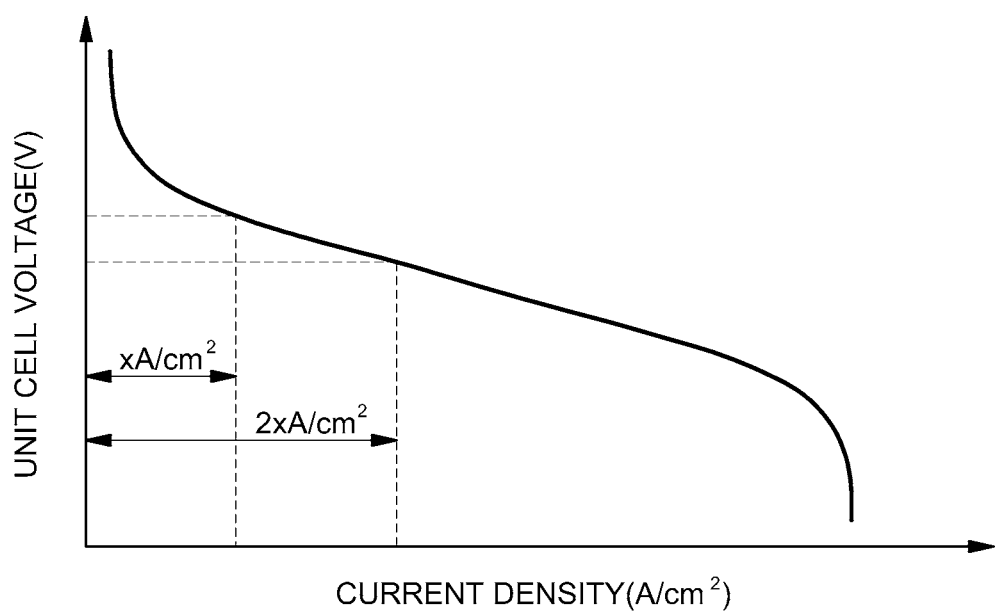
FIG. 9 is a graph showing a change in unit cell voltage of a fuel cell.

Referring to FIG. 9, in a fuel cell stack, as current output per unit area increases, voltage of a unit cell decreases and when a load of a vehicle extracts the current from a fuel cell, there is not a significant issue in the fuel cell the unit cell voltage is lower than predetermined voltage.

In contrast, when the current amount extracted by the load of a fuel cell vehicle decreases, because the unit cell voltage of the fuel cell correspondingly increases, it is preferable that the current is extracted from the fuel cell and used to meet the load demand. However, a significant amount of spare electric energy is generated, and it is not easy to store or consume the spare electric energy.

Therefore, it is preferable to manage the voltage of the unit cell of the fuel cell to be lower than the predetermined voltage. When the current amount used in the load is reduced, the unit cell voltage of the fuel cell increases more than desired, and, as a result, spare electric energy is generated and a catalytic layer of a cathode deteriorates, thereby degrading the performance of the fuel cell.

When the catalytic layer of the cathode deteriorates, an oxide coating is formed on the catalyst surface of the cathode, disrupting adsorption of the reaction oxygen ($O_2$) onto the catalyst surface, and as a result, decreasing stack performance. In an example embodiment, the catalytic layer is platinum supported on carbon (Pt/C), and the resulting oxides are Pt-Oxide, Pt—OH, Pt—O, Pt—$O_2$, and the like.

Accordingly, it is preferable to manage the unit cell voltage of the fuel cell to be lower than predetermined voltage while operating the fuel cell system, and it is preferable to avoid a high-potential operation in which the unit cell voltage of the fuel cell increases more than desired even though the current amount used in the load is reduced.

The present disclosure addresses these issues by providing a fuel cell stack including a first separation plate having a first flow path and a second separation plate having a different air flow path, enabling high-potential avoidance operation of the fuel cell system and cathode performance recovery by creating a hydrogen atmosphere in the cathode during the high-potential operation, while still allowing the fuel cell stack to generate electricity.

Figure 3C:
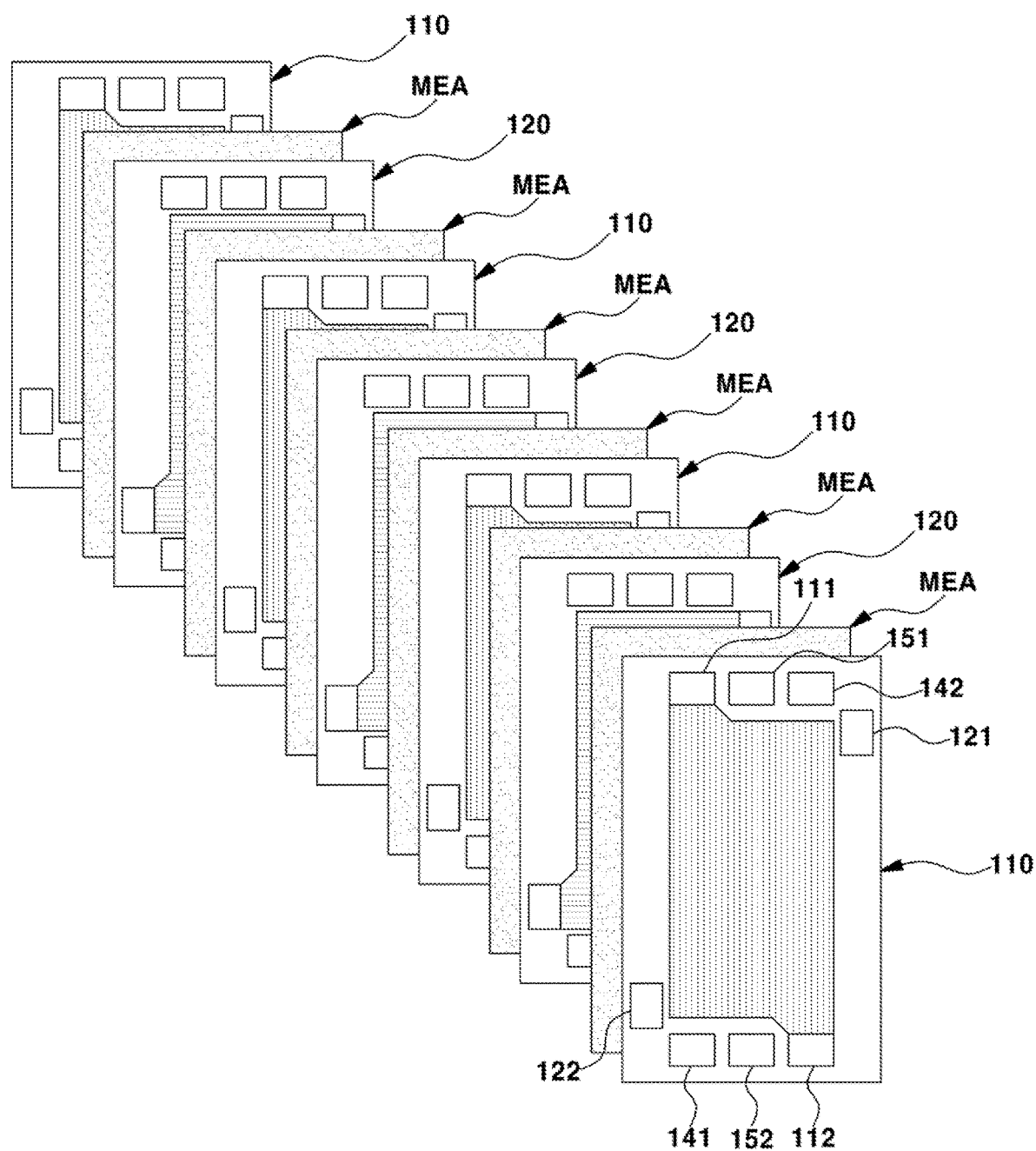
Figure 4:
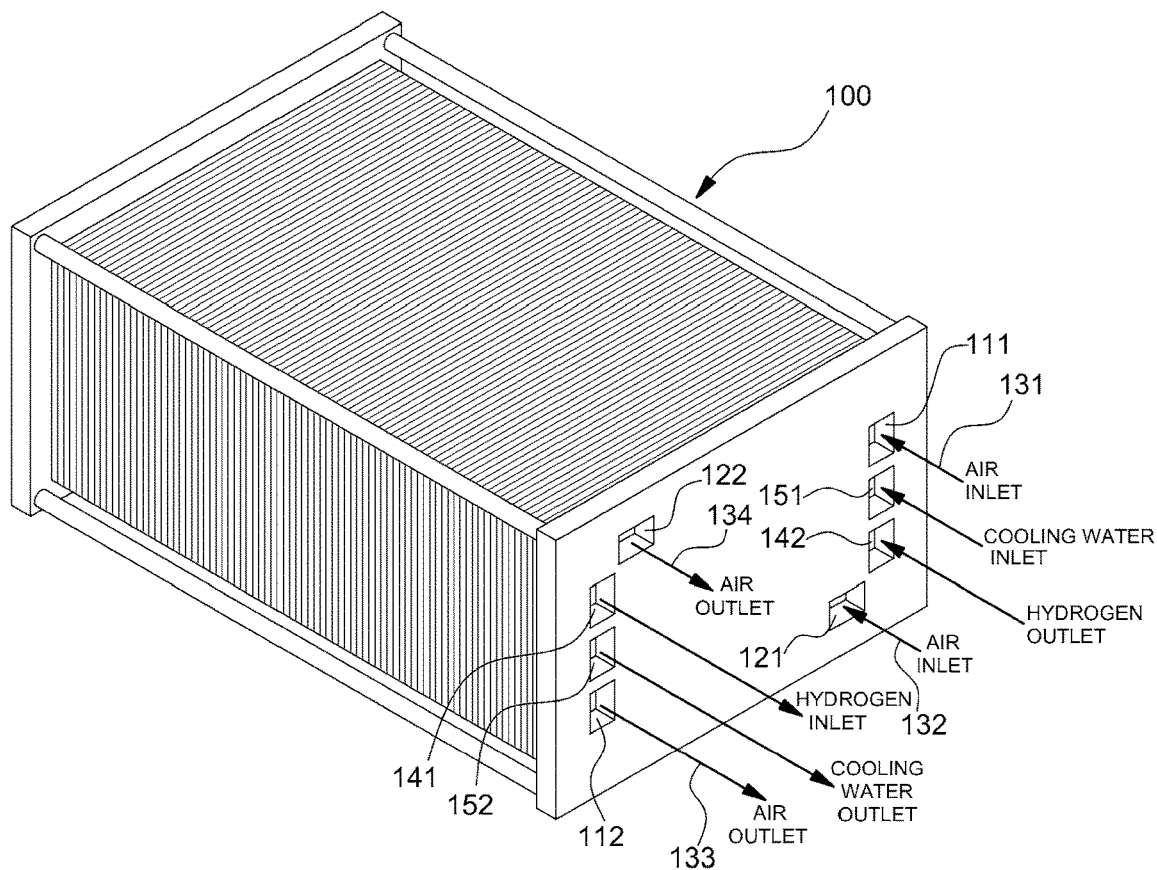
FIG. 4 illustrates an exterior structure of a stack in an example embodiment of a fuel cell system according to the present disclosure.

FIGS. 3A, 3B, and 3C are schematic views illustrating the separation plate structure of an example fuel cell system according to the present disclosure and FIG. 4 illustrates the exterior structure of a fuel cell stack including the separation plates of FIGS. 3A, 3B, and 3C.

As illustrated in FIGS. 3A, 3B 3C and 4, a fuel cell stack 100 is provided, in which a first separation plate 110 having a first air flow path 114 and a second separation plate 120 having a second air flow path 124 different from the first air flow path 114 are alternately stacked with an MEA interposed therebetween.

In this configuration, the MEA includes a polymer electrolyte membrane, a cathode and an anode disposed on each side of the polymer electrolyte membrane, and a gas diffusion layer (GDL) stacked outside cathode and anode.

For reference, cells including first separation plate 110 in fuel cell stack 100 may be referred to as a first stack and cells including second separation plate 120 may be referred to as a second stack.

As illustrated in FIG. 3a and FIG. 4, in first separation plate 110, a first air flow path 114 comprises a first air inlet manifold 111 connected with a first air inlet line 131, a first air outlet manifold 112 connected with a first air outlet line 133, and a first channel 113 formed between and communicating with first air inlet manifold 111 and first air outlet manifold 112.

First separation plate 110 further comprises a second air inlet manifold 121 connected with a second air inlet line 132 and a second air outlet manifold 122 connected with a second air outlet line 134. Second air inlet manifold 121 and second air outlet manifold 122 transfer air to the inlet and outlet manifolds of the adjacent second separation plates 120 and are not in communication with each other by the channel 113.

As illustrated in FIG. 3B and FIG. 4, in second separation plate 120, a second air flow path 124 comprises the second air inlet manifold 121 connected with the second air inlet line 132, the second air outlet manifold 122 connected with the second air outlet line 134, and a second channel 123 formed between and in communication with second air inlet manifold 121 and second air outlet manifold 122.

Second separation plate 120 further comprises first air inlet manifold 111 connected with first air inlet line 131 and first air outlet manifold 112 connected with first air outlet line 133. First air inlet manifold 111 and first air outlet manifold 112 transfer air to the inlet and outlet manifolds of the adjacent first separation plate 110 and are not in communication with each other by channel 123.

First separation plate 110 and second separation plate 120 each further comprise a hydrogen flow path including a hydrogen supply manifold 141 and a hydrogen discharge manifold 142 and a cooling water flow path including a cooling water supply manifold 151 and a cooling water discharge manifold 152.

Example embodiments of the fuel cell system including the fuel cell stack and an operation process for the fuel cell system are described below.

First Example Embodiment

Figure 5:
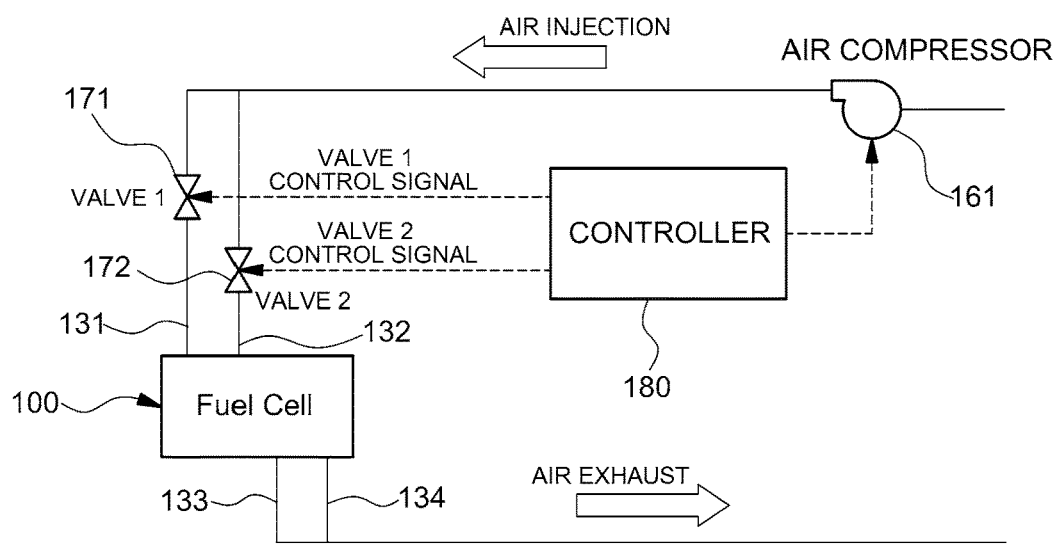
FIG. 5 is a diagram illustrating the configuration of a first example embodiment of a fuel cell system according to the present disclosure.
Figure 8:
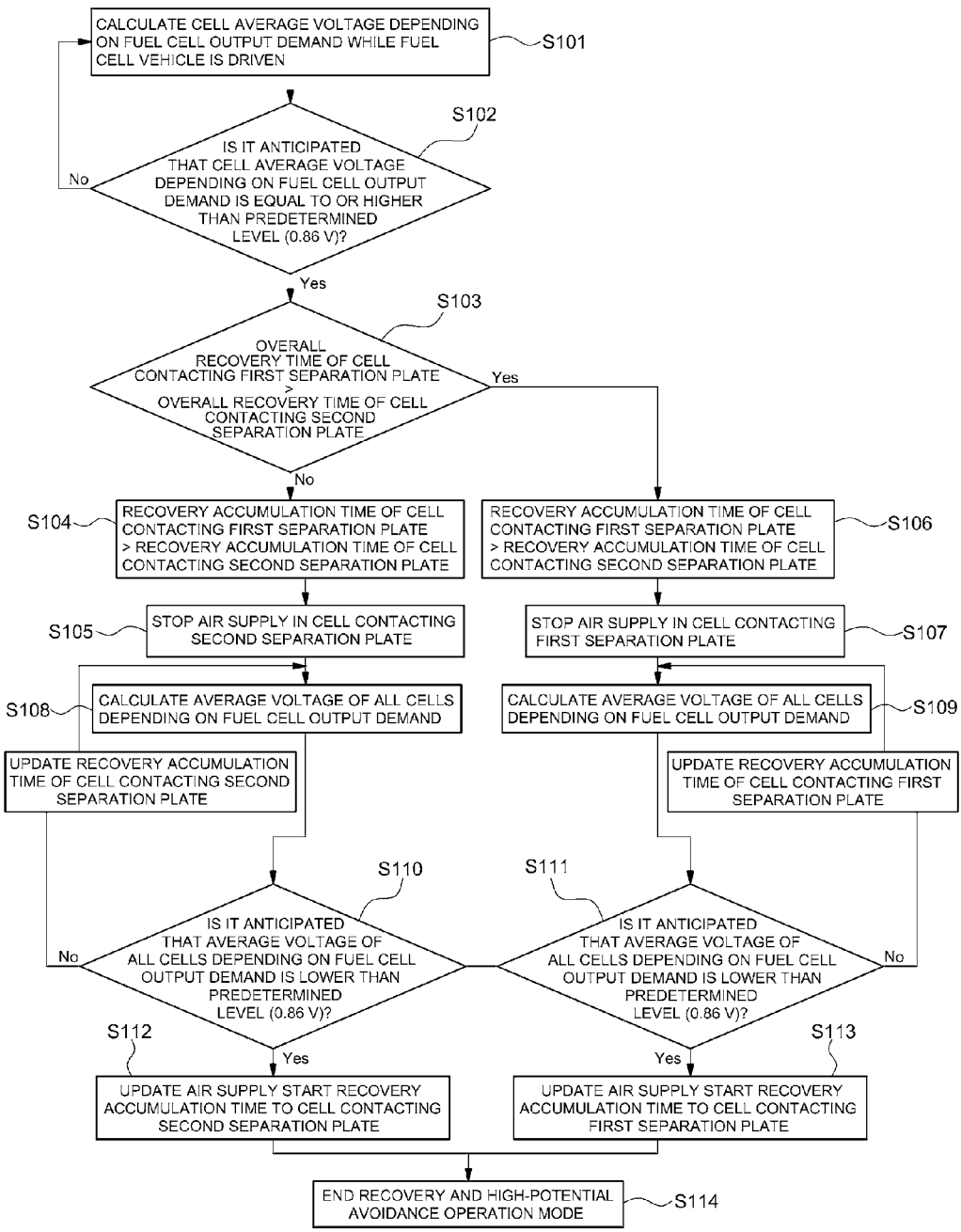
FIG. 8 is a flowchart illustrating a method for controlling a fuel cell system according to the present disclosure.

FIG. 5 is a diagram illustrating the configuration of a first example embodiment of a fuel cell system according to the present disclosure and FIG. 8 is a flowchart illustrating a method for controlling the example fuel cell system.

In FIG. 5, fuel cell stack 100 includes first separation plate 110 having first air flow path 114 and second separation plate 120 having second air flow path 124 different from first air flow path 114. First and second separation plates 110 and 120 are alternately stacked with an MEA interposed therebetween.

First air inlet line 131 and first air outlet line 133 are connected to an inlet and an outlet of first air flow path 114 of first separation plate 110 included in the fuel cell stack 100, respectively. That is, first air inlet line 131 and first air outlet line 133 are connected to first air inlet manifold 111 and first air outlet manifold 112 of first separation plate 110, respectively, to be in communication with each other.

Second air inlet line 132 and second air outlet line 134 are connected to the inlet and the outlet of second air flow path 124 of second separation plate 120 included in the fuel cell stack 100, respectively. That is, second air inlet line 132 and second air outlet line 134 are connected to second air inlet manifold 121 and second air outlet manifold 122 of second separation plate 120, respectively, to be in communication with each other.

In this configuration, a first air supply device 161 (for example, an air compressor or an air blower) is connected to first air inlet line 131, which is connected to first air inlet manifold 111 of first separation plate 110, and to second air inlet line 132, which is connected to second air inlet manifold 121 of second separation plate 120.

A first valve 171 is mounted on first air inlet line 131, and a second valve 172 is mounted on second air inlet line 132.

Opening and closing of first valve 171 and second valve 172 may be controlled by a controller 180. Controller 180 may also control operation of first air supply device 161.

Operation of the fuel cell system according to the first example embodiment of the present disclosure is described below, with reference to FIG. 8.

First, the voltage of each of the cells constituting the fuel cell stack is measured by a voltage measurement sensor (not illustrated) and transmitted to controller 180. Controller 180 then determines whether a high-potential avoidance operation is required.

For example, controller 180 may calculate the average voltage of the respective cells depending on a fuel cell output demand while operating the fuel cell system (i.e., while driving a fuel cell vehicle) (S101) and determine that a high-potential avoidance operation is required when the average voltage is greater than or equal to a threshold level (S102).

If controller 180 determines that a high-potential avoidance operation is required, it interrupts air supply to either first air flow path 114 of first separation plate 110 or second air flow path 124 of second separation plate 120. For example, the controller 180 may open first valve 171 mounted on first air inlet line 131 and close second valve 172 mounted on second air inlet line. Accordingly, the air from first air supply device 161 flows on first air flow path 114 of first separation plate 110 connected to first air inlet line 131, that is, through first air inlet manifold 111 of first separation plate 110, first channel 113, and first air outlet manifold 112. Because second valve 172 mounted on second air inlet line 132 is closed, the air from first air supply device 161 does not flow on second air flow path 124 of second separation plate 120 connected with second air inlet line 132.

In contrast, if controller 180 closes first valve 171 mounted on first air inlet line 131 and opens second valve 172 mounted on second air inlet line 132, the air flow on first air flow path 114 of first separation plate 110 connected to first air inlet line 131 is interrupted, and instead, the air from first air supply device 161 flows on second air flow path 124 of second separation plate 120 connected with second air inlet line 132, that is, through second air inlet manifold 121, second channel 123, and second air outlet manifold 122 of second separation plate 120.

If the output current of the fuel cell does not vary even before/after the first and second valves 171 and 172 are closed, the amount of the air which the air compressor as the first air supply device 161 supplies to the fuel cell also does not vary.

When the air is supplied only on first air flow path 114 of first separation plate 110 by closing second valve 172 or the air is supplied only on second air flow path 124 of second separation plate 120 by closing first valve 171, the pressure of the air passing through a stack inlet may slightly increase. To resolve the slight pressure increase, controller 180 may perform a correction control for the first air supply device 161 air compressor so as to supply the same air amount to the fuel cell before and after the closing of first valve 171 or second valve 172.

When second valve 172 is closed, the air flows only on first air flow path 114 of first separation plate 110 connected to first air inlet line 131. As a result, power generation (a reaction for normal electricity generation) occurs only in a cell including first separation plate 110 through which air flows. Because air flow is interrupted on second air flow path 124 of second separation plate 120 connected with second air inlet line 132, power generation does not occur in a cell including second separation plate 120.

As described above, when a high-potential avoidance operation is required (e.g., when power generation demand of the fuel cell is small), first air inlet line 131 or second air inlet line 132 is selectively opened/closed to allow power generation in the cell including the separation plate to which the air is supplied, and interrupt the power generation in the cell including the separation plate to which the air flow is interrupted. As a result of the high-potential avoidance operation, power generation occurs in only half of the cells of the fuel cell stack, decreasing output voltage of a unit cell.

When the air is interrupted on first air flow path 114 of first separation plate 110 or second air flow path 124 of second separation plate 120, autonomous hydrogen pumping occurs in the cathode of a specific cell including the separation plate to which the flow air is interrupted. As a result, a hydrogen atmosphere is created in the cathode, reducing a catalyst oxide formed on the surface of the cathode, and thereby achieving cathode performance recovery.

For example, when the air is supplied on first air flow path 114 of first separation plate 110 and the air is interrupted on second air flow path 124 of second separation plate 120, the autonomous hydrogen pumping occurs in the cell including second separation plate 120.

In more detail, when an external load extracts the electricity from the fuel cell, electrons move to an immediately adjacent cell in each cell of the fuel cell stack and the electrochemical reaction would normally occur in all cells. However, in the cell including second separation plate 120, no air is supplied, and, as a result, the electrochemical reaction does not occur. Simultaneously, the autonomous hydrogen pumping (i.e. where H+ ions transferred through the MEA and electrons transferred from the next cell meet, thereby generating hydrogen) occurs.

Creation of a hydrogen atmosphere in the cathode due to autonomous hydrogen pumping leads to reduction the catalyst oxide formed on the surface of the cathode, and as a result, cathode performance recovery.

As described above, in half of all cells of the fuel cell stack, the power generation occurs due to the air supply. Cathode performance recovery occurs in the other half of the cells due to air interruption and the resulting autonomous hydrogen pumping. Thus, cathode performance recovery does not require stopping operation of the fuel cell stack, and, as a result, the output voltage of the stack is not 0 V. Therefore, the external load may extract the electricity generated by half of the stack cells, while cathode performance recovery of the remaining stack cells concurrently occurs.

The control for interrupting the air supply to first separation plate 110 or second separation plate 120 may be selectively determined according to a recovery time and an overall recovery time of the stack.

For example, as shown in FIG. 8, an overall recovery time of cells (a first stack) including first separation plate 110 and an overall recovery time of cells (a second stack) including second separation plate 120 are compared with each other (S103). If the overall recovery time of the first stack is greater than the overall recovery time of the second stack, the air supply to separation plate 120 is interrupted, and as a result, cells contacting the second separation plate 120 are recovered (S104 and S105).

In contrast, when the overall recovery time of the first stack is less than the overall recovery time of the second stack, the air supply to first separation plate 110 is interrupted, and as a result, cells contacting first separation plate 110 are recovered (S106 and S107).

For purposes of these comparisons, the overall recovery time of a stack represents the time between interrupting the air flow to the stack and resuming operation of the stack, that is, the time between interrupting the air flow and the time of resuming air supply.

Recovery time may be determined by the pressure of the air supplied to the stack. For example, when air flow to the stack is interrupted and thereafter, the air pressure in the stack decreases to a predetermined pressure or less, the interruption time starts. When the air supply is resumed and the air pressure in the stack is higher than the predetermined pressure, the interruption time ends. The time from the start of the interruption time to the end of the interruption time is the recovery time.

During a high-potential avoidance operation, controller 180 determines whether the high-potential avoidance operation should be cancelled (S108 to S111), and, if so, the high-potential avoidance operation ends (S112 to S114).

For example, controller 180 may calculate the average voltage of each cell depending on the fuel cell output demand during the high-potential avoidance operation, determine that the high-potential avoidance operation should be canceled when the calculated average voltage is lower than a threshold level, update the overall recovery time of the cells including first separation plate 110 or the cells including second separation plate 120 and thereafter, end the high-potential avoidance operation.

When the high-potential avoidance operation is cancelled, the air supply resumes to first air flow path 114 of first separation plate 110 or second air flow path 124 of second separation plate 120 in which the air supply was previously interrupted.

When a high-potential avoidance operation is canceled, controller 180 supplies the air from first air supply device 161 to both first air flow path 114 of first separation plate 110 and second air flow path 124 of second separation plate 120 by opening both first valve 171 and second valve 172 to allow power generation to occur in all cells of the fuel cell stack including first separation plate 110 and second separation plate 120.

Second Example Embodiment

Figure 6:
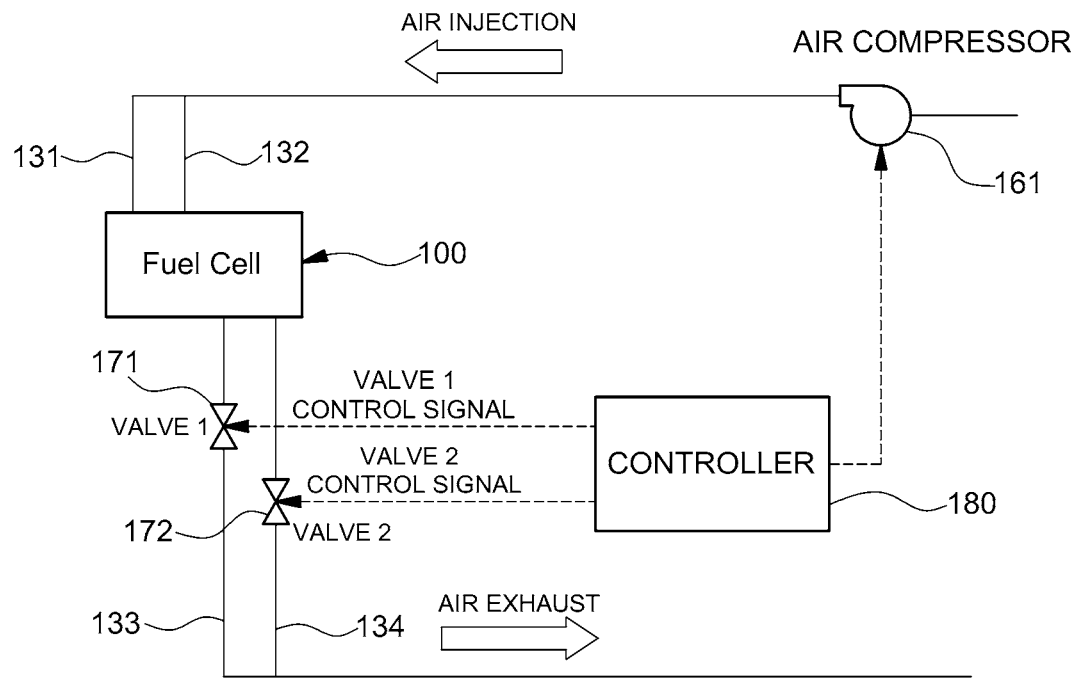
FIG. 6 is a diagram illustrating the configuration of a second example embodiment of a fuel cell system according to the present disclosure.

FIG. 6 is a diagram illustrating the configuration of a fuel cell system according to a second example embodiment of the present disclosure.

The second example embodiment of the present disclosure is similar to the first example embodiment except that the mounting positions of first valve 171 and second valve 172 are different, as illustrated in FIG. 6.

First valve 171 and second valve 172 are mounted on first air outlet line 133 connected to an outlet of first air flow path 114 of first separation plate 110 and on second air outlet line 134 connected to an outlet of second air flow path 124 of second separation plate 120, respectively.

When a high-potential avoidance operation is required, controller 180 selectively controls closing of first valve 171 mounted on first air outlet line 133 or second valve 172 mounted on second air outlet line 134 to interrupt the air supply to either first air flow path 114 of first separation plate 110 or second air flow path 124 of second separation plate 120.

Therefore, similar to the first example embodiment, power generation occurs in the cells including the separation plate to which air is supplied, and power generation is interrupted in the cells including the separation plate to which air flow is interrupted. As a result of the high-potential avoidance operation, power generation is performed only in a half of all cells of the fuel cell stack, thereby decreasing the output voltage of the unit cell.

As with the first example embodiment, when the air flow is interrupted on first air flow path 114 of first separation plate 110 or second air flow path 124 of second separation plate 120, autonomous hydrogen pumping occurs with respect to the cathode of a specific cell contacting the separation plate in which the air flow is interrupted. As a result, a hydrogen atmosphere is created in the cathode, causing reduction of an oxide coating formed on the surface of the cathode, thereby achieving cathode performance recovery.

When a high-potential operation is required, controller 180 supplies the air from first air supply device 161 to both first air flow path 114 of first separation plate 110 and second air flow path 124 of second separation plate 120 by opening both first valve 171 and second valve 172, allowing power generation to occur in all cells of the fuel cell stack including first separation plate 110 and second separation plate 120.

Third Example Embodiment

Figure 7:
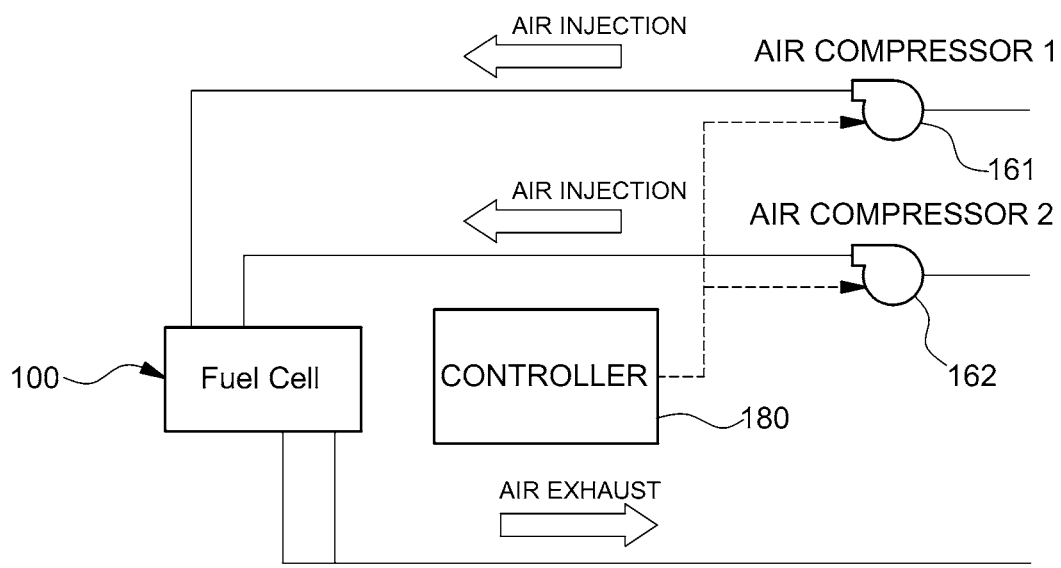
FIG. 7 is a diagram illustrating the configuration of a third example embodiment a fuel cell system according to of the present disclosure.

FIG. 7 is a diagram illustrating the configuration of a fuel cell system according to a third example embodiment of the present disclosure.

In the third example embodiment of the present disclosure, as illustrated in FIG. 7, air is supplied by a first air supply device 161 and a second air supply device 162 so that there is no need for first valve 171 or second valve 172. First air supply device 161 and second air supply device selectively supply the air to first air flow path 114 of first separation plate 110 or second air flow path 124 of second separation plate 120. First air supply device 161 is connected to first air inlet line 131, and second air supply device 162 is connected to second air inlet line 132.

Accordingly, when a high-potential avoidance operation is required, controller 180 selectively controls operation of first air supply device 161 or second air supply device 162 to supply air to only one of first air flow path 114 of first separation plate 110 and second air flow path 124 of second separation plate 120 and interrupt air supply to the other flow path.

As with the first example embodiment, power generation occurs in the cells including the separation plate to which the air is supplied, and power generation is interrupted in the cells including the separation plate to which the air flow is interrupted. As a result of the high-potential avoidance operation, power generation occurs only in a half of all cells of the fuel cell stack, decreasing the output voltage of the unit cell.

As with the first example embodiment, when air flow is interrupted to first air flow path 114 of first separation plate 110 or to second air flow path 124 of second separation plate 120, autonomous hydrogen pumping occurs with respect to the cathode of a specific cell contacting the separation plate to which air flow is interrupted. As a result, a hydrogen atmosphere is created in the cathode causing reduction an oxide coating formed on the surface of the cathode, thereby achieving cathode performance recovery.

When a high-potential operation is required, controller 180 activated both first air supply device 161 and second air supply device 162, providing air flow to both first air flow path 114 of first separation plate 110 and second air flow path 124 of second separation plate 120, allowing power generation to occur in all cells of the fuel cell stack including first separation plate 110 and second separation plate 120.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:
1. A fuel cell system comprising:
a fuel cell stack in which a first separation plate having a first air flow path and a second separation plate having a second air flow path are alternately stacked with a membrane-electrode assembly interposed therebetween;
a first air inlet line connected to an inlet of the first air flow path of the first separation plate;
a first air outlet line connected to an outlet of the first air flow path of the first separation plate;
a second air inlet line connected to an inlet of the second air flow path of the second separation plate;
a second air outlet line connected to an outlet of the second air flow path of the second separation plate;
an air supply device connected to the first air inlet line of the first separation plate and the second air inlet line of the second separation plate;
a first valve mounted on the first air inlet line or the first air outlet line;
a second valve mounted on the second air inlet line or the second air outlet line; and
a controller controlling operation of the air supply device and controlling opening and closing of the first valve and the second valve;
wherein the first air flow path of the first separation plate includes a first air inlet manifold connected with the first air inlet line, a first air outlet manifold connected with the first air outlet line, and a first channel formed between and communicating with the first air inlet manifold and the first air outlet manifold; and wherein the first separation plate further includes a second air inlet manifold connected with the second air inlet line and a second air outlet manifold connected with a second air outlet line; and wherein the second air inlet manifold connected with the second air inlet line and the second air outlet manifold connected with the second air outlet line do not communicate with each other.

2. The fuel cell system of claim 1, wherein the second air flow path of the second separation plate includes a second air inlet manifold connected with the second air inlet line, a second air outlet manifold connected with the second air outlet line, and a second channel formed between and communicating with the second air inlet manifold and the second air outlet manifold; and wherein the second separation plate further includes a first air inlet manifold connected with the first air inlet line and a first air outlet manifold connected with the first air outlet line are further formed while being interrupted from each other; and wherein the first air inlet manifold connected with first second air inlet line and the first air outlet manifold connected with the first air outlet line do not communicate with each other.

3. The fuel cell system of claim 1, wherein when a high-potential avoidance operation is required, the controller selectively controls closing of the first valve or the second valve to interrupt the air supply to either the first air flow path of the first separation plate or the second air flow path of the second separation plate.

4. The fuel cell system of claim 3, wherein when air flow is interrupted to the first air flow path of the first separation plate or the second air flow path of the second separation plate, autonomous hydrogen pumping occurs in a cathode of a cell including a separation plate to which the air flow is interrupted.

5. The fuel cell system of claim 1, wherein when a high-potential operation is required, the controller selectively controls opening of both the first valve and the second valve to supply the air to both the first air flow path of the first separation plate and the second air flow path of the second separation plate.

6. A fuel cell system comprising:

a fuel cell stack in which a first separation plate having a first air flow path and a second separation plate having a second air flow path are alternately stacked with a membrane-electrode assembly interposed therebetween;

a first air inlet line connected to an inlet of the first air flow path of the first separation plate;

a first air outlet line connected to an outlet of the first air flow path of the first separation plate;

a second air inlet line connected to an inlet of the second air flow path of the second separation plate;

a second air outlet line connected to an outlet of the second air flow path of the second separation plate;

a first air supply device connected to the first air inlet line;

a second air supply device connected to the second air inlet line; and a controller controlling operation of the first air supply device and the second air supply device;

wherein the first air flow path of the first separation plate includes a first air inlet manifold connected with the first air inlet line, a first air outlet manifold connected with the first air outlet line, and a first channel formed between and communicating with the first air inlet manifold; and the first air outlet manifold; and wherein the first separation plate further includes a second air inlet manifold connected with the second air inlet line and a second air outlet manifold connected with the second air outlet line; and wherein the second air inlet manifold connected with second air inlet line and the second air outlet manifold connected with the second air outlet line do not communicate with each other.

7. The fuel cell system of claim 6, wherein the second air flow path of the second separation plate a second air inlet manifold connected with the second air inlet line, a second air outlet manifold connected with the second air outlet line, and a second channel formed between the second air inlet manifold and the second air outlet manifold; and wherein the second separation plate further includes a first air inlet manifold connected with the first air inlet line and a first air outlet manifold connected with the first air outlet line; and wherein the first air inlet manifold connected with the first air inlet line and the first air outlet manifold connected with the first air outlet line do not communicate with each other.

8. The fuel cell system of claim 6, wherein when a high-potential avoidance operation is required, the controller selectively controls operation of the first air supply device or the second air supply device to interrupt the air supply to either the first air flow path of the first separation plate or the second air flow path of the second separation plate.

9. The fuel cell system of claim 8, wherein when air flow is interrupted to the first air flow path of the first separation plate or the second air flow path of the second separation plate, autonomous hydrogen pumping occurs in a cathode of a cell including a separation plate to which air flow is interrupted.

10. The fuel cell system of claim 6, wherein when a high-potential operation is required, the controller selectively controls operation of the first air supply device and the second air supply device to supply the air to both the first air flow path of the first separation plate and the second air flow path of the second separation plate.

* * * * *